US011402501B2

(12) United States Patent
Segami et al.

(10) Patent No.: US 11,402,501 B2
(45) Date of Patent: Aug. 2, 2022

(54) RADAR APPARATUS, RADAR SYSTEM, AND RADAR APPARATUS CONTROL METHOD

(71) Applicant: SONY SEMICONDUCTOR SOLUTIONS CORPORATION, Kanagawa (JP)

(72) Inventors: Masahiro Segami, Kanagawa (JP); Yuki Yagishita, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 311 days.

(21) Appl. No.: 16/482,026

(22) PCT Filed: Nov. 15, 2017

(86) PCT No.: PCT/JP2017/041013
§ 371 (c)(1),
(2) Date: Jul. 30, 2019

(87) PCT Pub. No.: WO2018/154875
PCT Pub. Date: Aug. 30, 2018

(65) Prior Publication Data
US 2019/0369237 A1 Dec. 5, 2019

(30) Foreign Application Priority Data
Feb. 22, 2017 (JP) .............................. JP2017-031451

(51) Int. Cl.
*G01S 15/10* (2006.01)
*G01S 7/524* (2006.01)
*G01S 7/526* (2006.01)

(52) U.S. Cl.
CPC ............ *G01S 15/101* (2013.01); *G01S 7/524* (2013.01); *G01S 7/526* (2013.01)

(58) Field of Classification Search
CPC combination set(s) only.
See application file for complete search history.

(56) References Cited

U.S. PATENT DOCUMENTS 5,535,176 A * 7/1996 Yang ..................... H04B 13/02
367/13
6,563,761 B1 5/2003 Schaffran et al.
(Continued)

FOREIGN PATENT DOCUMENTS

JP  60-129678 A  7/1985
JP  09-184883 A  7/1997
(Continued)

OTHER PUBLICATIONS

Shinichi Ito, "Basic theory of radar systems", Corona Publishing Company, Ltd., 2015, pp. 72-73.
(Continued)

*Primary Examiner* — Isam A Alsomiri
*Assistant Examiner* — Amie M Ndure
(74) *Attorney, Agent, or Firm* — Chip Law Group

(57) ABSTRACT

A detectable range is increased in a radar apparatus that measures a distance from a round-trip time of a sound wave. A transmitting unit transmits a plurality of sound waves including different frequency components in order. A receiving unit receives reflected waves obtained as the plurality of sound waves is reflected. An analyzing unit analyzes a frequency component of each of the reflected waves and identifies, for each reflected wave, the sound wave corresponding to the reflected wave among the plurality of sound waves on the basis of the analysis result. A ranging unit acquires a distance corresponding to a period of time from a transmission time of the sound wave corresponding to the reflected wave to a reception time of the reflected wave.

5 Claims, 12 Drawing Sheets

(56) References Cited

U.S. PATENT DOCUMENTS

| | | | |
|---|---|---|---|
| 6,898,151 B1 * | 5/2005 | Lyon | G01F 23/296 367/99 |
| 7,486,591 B2 * | 2/2009 | Rooney, III | G01S 7/524 367/137 |
| 2008/0165620 A1 * | 7/2008 | Sugiura | G01S 17/89 367/99 |
| 2014/0355385 A1 * | 12/2014 | Inagaki | G01S 15/931 367/99 |
| 2017/0176594 A1 | 6/2017 | Ichikawa et al. | |

FOREIGN PATENT DOCUMENTS

| | | | |
|---|---|---|---|
| JP | 09184883 A | * | 7/1997 |
| JP | 2015-017942 A | | 1/2015 |
| JP | 2015-184235 A | | 10/2015 |
| WO | 2016/042697 A1 | | 3/2016 |

OTHER PUBLICATIONS

"Parameter of Radar Equation", 2 pages.
International Search Report and Written Opinion of PCT Application No. PCT/JP2017/041013, dated Feb. 20, 2018, 10 pages of ISRWO.

* cited by examiner

254

| Frequency identification information | Frequency component |
|---|---|
| 0 | $f_0$ and $f_4$ ($f_0/f_4 = K_0$) |
| 1 | $f_1$ and $f_5$ ($f_1/f_5 = K_1$) |
| 2 | $f_2$ and $f_6$ ($f_2/f_6 = K_2$) |
| 3 | $f_3$ and $f_7$ ($f_3/f_7 = K_3$) |

FIG.11

RADAR APPARATUS, RADAR SYSTEM, AND RADAR APPARATUS CONTROL METHOD

CROSS REFERENCE TO RELATED APPLICATIONS

This application is a U.S. National Phase of International Patent Application No. PCT/JP2017/041013 filed on Nov. 15, 2017, which claims priority benefit of Japanese Patent Application No. JP 2017-031451 filed in the Japan Patent Office on Feb. 22, 2017. Each of the above-referenced applications is hereby incorporated herein by reference in its entirety.

TECHNICAL FIELD

The present technology relates to a radar apparatus, a radar system, and a radar apparatus control method. Specifically, the present technology relates to a radar apparatus, a radar system, and a radar apparatus control method which are capable of measuring a distance from a round-trip time of a sound wave.

BACKGROUND ART

In the past, a radar apparatus has been used to measure a distance to a target in a mobile object such as an automobile or a drone. Here, when it focuses on modulation, radar apparatuses can be classified into a pulse radar that generates intermittent transmission waves as pulses by on/off modulation and a continuous wave radar that transmits a continuous transmission wave without performing on/off modulation. Also, when it focuses on a type of transmission wave, radar apparatuses can be classified into an ultrasonic wave radar that uses an ultrasonic wave as a transmission wave and an electromagnetic wave radar that uses an electromagnetic wave.

Here, the pulse radar measures a distance to a target from a round-trip time taken until a pulse is reflected and comes back. Further, in this pulse radar, a maximum detectable range $R_{MAX}$ which is a distance which can be measured is indicated by the following Formula (see, for example, Non-Patent Literature 1).

$$R_{MAX}=c/(2 \times f_P) \quad \text{Formula 1}$$

In the above Formula, c is a propagation velocity of pulse, and a unit is, for example, a meter per second (m/s). $f_P$ is a pulse repetition frequency, and a unit is, for example, Hertz (Hz). Also, a unit of the maximum detectable range $R_{MAX}$ is, for example, meter (m).

CITATION LIST

Non-Patent Literature

Non-Patent Literature 1: Shinichi Ito, "Basic theory of radar system," Corona Publishing Co., Ltd, p72 to p73

DISCLOSURE OF INVENTION

Technical Problem

In the related art, the pulse radar can measure a distance which is within the maximum detectable range $R_{MAX}$ in Formula 1 from the round-trip time. However, when the ultrasonic wave pulse is used, there is a problem in that the maximum detectable range $R_{MAX}$ is very short as compared with the electromagnetic wave radar. This is because, when the ultrasonic wave is used, the propagation velocity c of the pulse in Formula 1 is the velocity of sound, and the velocity of sound is much slower than the velocity of light of the electromagnetic wave.

The present technology was made in light of the foregoing, and it is an object of the present technology to increase the detectable range in the radar apparatus that measures the distance from the round-trip time of the sound wave.

Solution to Problem

The present technology was made to solve the above-described problems, and a first aspect thereof provides a radar apparatus including a transmitting unit that transmits a plurality of sound waves including different frequency components in order, a receiving unit that receives reflected waves obtained as the plurality of sound waves is reflected, an analyzing unit that analyzes a frequency component of each of the reflected waves and identifies, for each reflected wave, the sound wave corresponding to the reflected wave among the plurality of sound waves on the basis of the analysis result, and a ranging unit that acquires a distance corresponding to a period of time from a transmission time of the sound wave corresponding to the reflected wave to a reception time of the reflected wave and a control method thereof. Accordingly, there is an effect that the distance corresponding to the period of time from the transmission time of the sound wave to the reception time of the reflected wave specified by the analysis result of the frequency component is acquired.

In the first aspect, the plurality of sound waves may have different frequencies, and the analyzing unit may analyze a frequency of the reflected wave. Accordingly, there is an effect that the corresponding sound wave is identified by the analysis result of the frequency of the reflected wave.

In the first aspect, the analyzing unit may include a reception band-based frequency table in which the frequency of each of the plurality of sound waves is associated with a reception band including the frequency and a frequency specifying unit that specifies the sound wave corresponding to the reception band including the frequency of the reflected wave as the sound wave corresponding to the reflected wave. Accordingly, there is an effect that the sound wave corresponding to the reception band including the frequency of the reflected wave is acquired as the corresponding sound wave.

Further, in the first aspect, each of the plurality of sound waves may include a pair of frequency components, the plurality of sound waves may differ in a frequency ratio of each of the pair of frequency components, and the analyzing unit may analyze the frequency ratio of each of a pair of frequency components in the reflected wave. Accordingly, there is an effect that the corresponding sound wave is specified by the analysis result of the frequency ratio of each of the frequency components.

Further, in the first aspect, the analyzing unit may include a frequency reference table which holds the frequency ratio as a frequency ratio for each of the plurality of sound waves and a frequency specifying unit that specifies the sound wave corresponding to the frequency ratio substantially coinciding with the frequency ratio of each of the pair of frequency components in the reflected wave as the sound wave corresponding to the reflected wave. Accordingly, there is an effect that the sound wave substantially coinciding with the frequency ratio of each of the pair of frequency components in the reflected wave is specified.

Further, in the first aspect, each of the plurality of sound waves may be a pulse. Accordingly, there is an effect that the distance corresponding to the period of time from the transmission time to the reception time of the pulse is acquired.

Further, a second aspect of the present technology provides a radar system including a transmitting unit that transmits a plurality of sound waves including different frequency components in order, a receiving unit that receives reflected waves obtained as the plurality of sound waves is reflected, an analyzing unit that analyzes a frequency component of each of the reflected waves and identifies, for each reflected wave, the sound wave corresponding to the reflected wave among the plurality of sound waves on the basis of the analysis result, a ranging unit that acquires a distance corresponding to a period of time from a transmission time of the sound wave corresponding to the reflected wave to a reception time of the reflected wave, and a control unit that performs predetermined control on the basis of the acquired distance. Accordingly, there is an effect that the distance corresponding to the period of time from the transmission time of the sound wave to the reception time of the reflected wave specified by the analysis result of the frequency component is acquired, and predetermined control is performed on the basis of the distance.

Advantageous Effects of Invention

According to the present technology, there is an effect capable of increasing the detectable range in the radar apparatus that measures the distance from the round-trip time of the sound wave. Note that the effects described herein are not necessarily limited, and any of effects described in the present disclosure may be included.

BRIEF DESCRIPTION OF DRAWINGS

FIG. 11 is a diagram illustrating an example of a frequency reference table in the second embodiment of the present technology.

MODE(S) FOR CARRYING OUT THE INVENTION

Hereinafter, modes (hereinafter, referred to as "embodiments") for carrying out the present technology will be described. The description will proceed in the following order.
1. First embodiment (example of changing transmission frequency for pulse period)
2. Second embodiment (example of changing frequency ratio for pulse period)

1. First Embodiment

Figure 1:
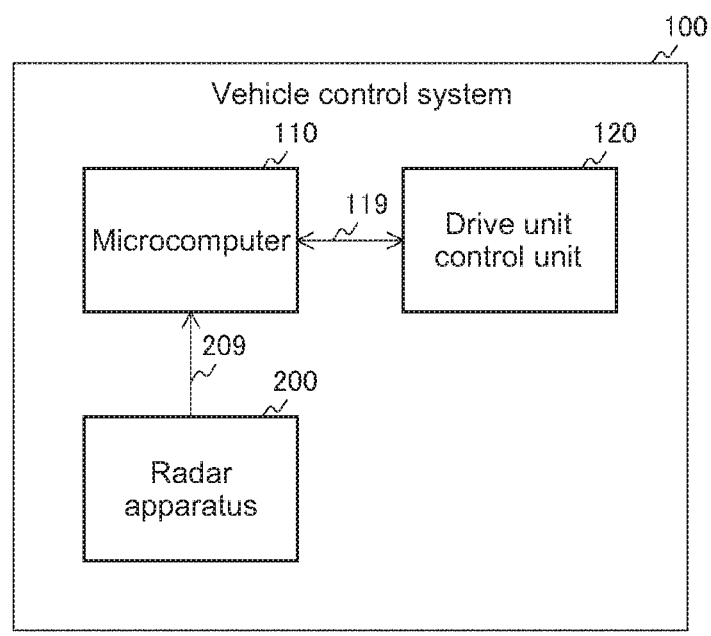
FIG. 1 is a block diagram illustrating a configuration example of a vehicle control system in a first embodiment of the present technology.

[Configuration Example of Vehicle Control System]
FIG. 1 is a block diagram illustrating a configuration example of a vehicle control system 100 in a first embodiment of the present technology. The vehicle control system 100 controls an automobile and includes a microcomputer 110, a drive unit control unit 120, and a radar apparatus 200.

The radar apparatus 200 measures a distance to a target outside a vehicle in each of a plurality of directions. The radar apparatus 200 supplies distance information indicating the measured distance in each direction to the microcomputer 110 through a signal line 209.

The microcomputer 110 controls the vehicle control system 100 in general. The microcomputer 110 acquires various types of information for recognizing a situation outside the vehicle such as distance information from the radar apparatus 200 and image data from an in-vehicle camera. Then, the microcomputer 110 calculates a control target value of a drive system on the basis of the acquired information and outputs a control command to the drive unit control unit 120 via a signal line 119. For example, the microcomputer 110 can perform cooperative control for the purpose of realizing the function of an advanced driver assistance system (ADAS). In the ADAS, control for collision avoidance or shock mitigation of a vehicle, following traveling based on a distance between vehicles, vehicle velocity maintaining traveling, vehicle collision warning, vehicle lane departure warning, or the like is executed.

Further, by controlling the drive system on the basis of the distance information or the like, the microcomputer 110 can perform cooperative control for the purpose of automatic driving of traveling autonomously without depending on a driver's operation or the like. Note that the microcomputer 110 is an example of a control unit described in claims set forth below. Also, the vehicle control system 100 is an example of a radar system described in claims set forth below.

Note that although the radar apparatus 200 is installed in the vehicle control system 100, the radar apparatus 200 may be installed in a system other than the vehicle control system 100 if it is a system using ranging information. For example, the radar apparatus 200 can be arranged in an aircraft control system that controls a drone.

[Configuration Example of Radar Apparatus]

Figure 2:
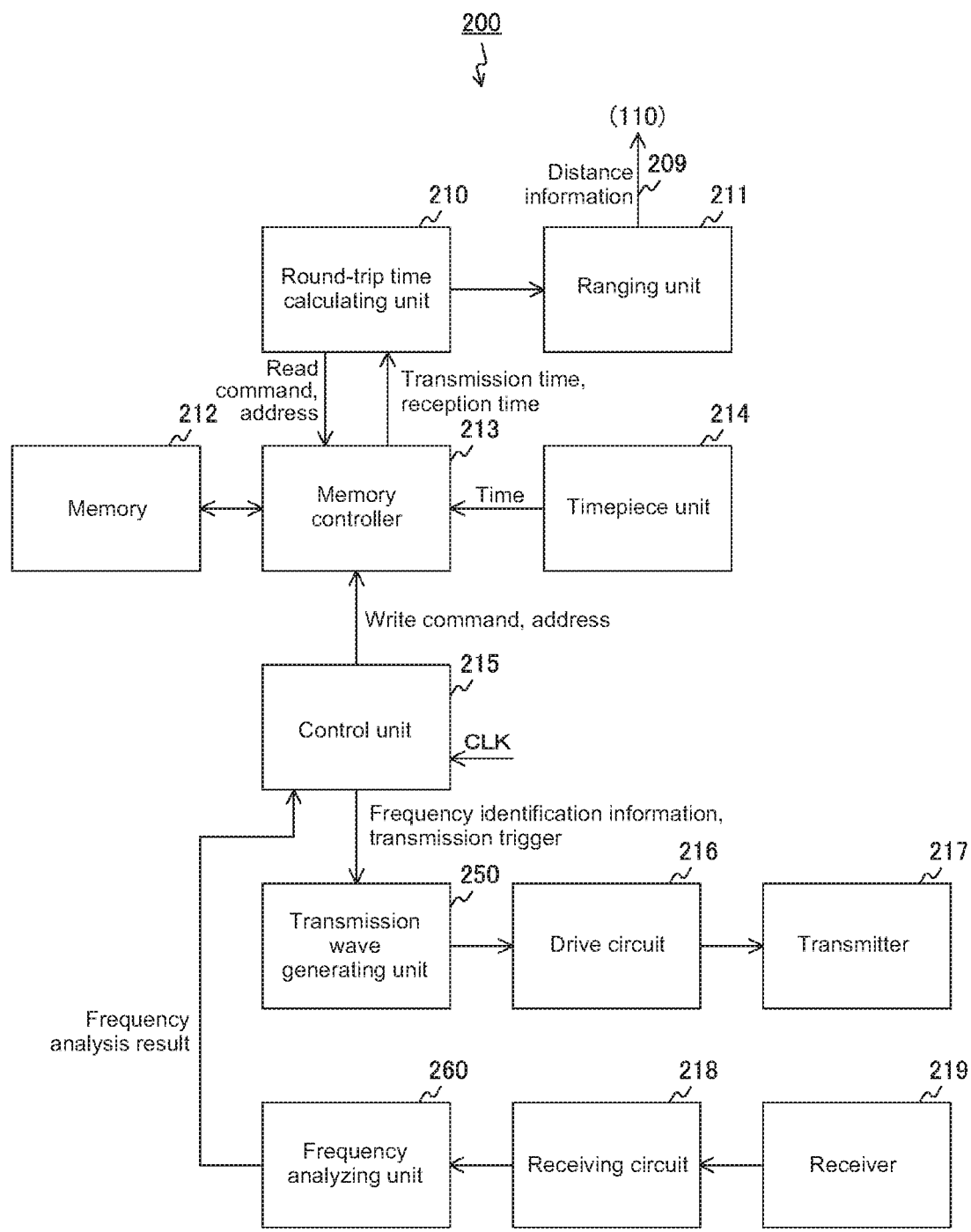
FIG. 2 is a block diagram illustrating a configuration example of a radar apparatus in the first embodiment of the present technology.

FIG. 2 is a block diagram illustrating a configuration example of the radar apparatus 200 in the first embodiment of the present technology. The radar apparatus 200 includes a round-trip time calculating unit 210, a ranging unit 211, a memory 212, a memory controller 213, and a timepiece unit 214. Also, the radar apparatus 200 includes a control unit 215, a transmission wave generating unit 250, a drive circuit 216, a transmitter 217, a frequency analyzing unit 260, a receiving circuit 218, and a receiver 219.

The control unit 215 controls the radar apparatus 200 in general in synchronization with a clock signal CLK. The control unit 215 generates a transmission trigger and frequency identification information each time a predetermined pulse period elapses, and supplies the transmission trigger and the frequency identification information to the transmission wave generating unit 250. Here, the transmission trigger is a signal for instructing transmission of a pulse of a sound wave (for example, an ultrasonic wave) as a transmission wave. Also, the "pulse" is a signal that is repeatedly and intermittently transmitted at certain intervals. The "pulse period" is an interval for transmitting a pulse and is a reciprocal of the pulse repetition frequency fp.

Also, the frequency identification information is information identifying a frequency component of the pulse. The control unit 215 changes the frequency identification information for each pulse period. By this control, a plurality of pulses (that is, transmission waves) including different frequency components is sequentially transmitted at intervals of the pulse periods.

Further, each time the control unit 215 supplies the transmission trigger and the frequency identification information, the control unit 215 issues a write command designating an address corresponding to the frequency identification information and supplies the write command to the memory controller 213. Here, the write command is a command to write data at a designated address. Further, it is assumed that an address of a data write destination is set in advance for each frequency identification information. The control unit 215 can cause a transmission time and a reception time to be held in the memory 212 for each piece of frequency identification information by causing the memory controller 213 to write the transmission time and the reception time of the sound wave corresponding to the frequency identification information at the address corresponding to the frequency identification information. Then, the round-trip time calculating unit 210 to be described later can read out the transmission time and the reception time corresponding to the frequency identification information from the memory 212 and calculate a round-trip time from the transmission time to the reception time of the sound wave corresponding to the frequency identification information.

Then, the control unit 215 receives a frequency analysis result from the frequency analyzing unit 260. The control unit 215 issues a write command designating an address corresponding to the frequency analysis result and supplies the write command to the memory controller 213.

The transmission wave generating unit 250 generates, as transmission data, audio data of a frequency component indicated by the frequency identification information in synchronization with the transmission trigger. The transmission wave generating unit 250 supplies the generated transmission data to the drive circuit 216.

The drive circuit 216 performs digital to analog (DA) conversion of the transmission data, generates an analog electrical signal, drives the transmitter 217 through the electrical signal, and transmits the transmission wave (sound wave). The transmitter 217 transmits the transmission wave in accordance with the control of the drive circuit 216. For example, a transducer that converts an analog electrical signal obtained by DA-converting the transmission data (that is, the audio data) into the transmission wave (that is, the sound wave) which is air vibration is used as the transmitter 217. Note that the transmitter 217 is an example of a transmitting unit described in claims set forth below.

The receiver 219 receives a reflected wave obtained as the transmission wave is reflected against the target. The receiver 219 converts the received reflected wave into an analog electrical signal and supplies it to the receiving circuit 218 as a reception signal. For example, a transducer that converts a reflected wave of a sound into an analog electrical signal is used as the receiver 219. Note that the receiver 219 is an example of a receiving unit described in claims set forth below.

The receiving circuit 218 performs various types of processing such as amplification, offset addition, filtering, and analog to digital (AD) conversion on a reception signal. The receiving circuit 218 supplies the processed reception data to the frequency analyzing unit 260. Note that although the receiving circuit 218 performs AD conversion, the receiver 219 may perform AD conversion instead of the receiving circuit 218.

The frequency analyzing unit 260 analyzes a frequency component of the reflected wave on the basis of the reception data. The frequency analyzing unit 260 specifies a transmission wave corresponding to the reflected wave on the basis of an analysis result, and supplies a frequency analysis result indicating the frequency identification information to the control unit 215. Note that the frequency analyzing unit 260 is an example of an analyzing unit described in claims set forth below.

The timepiece unit 214 measures a time. The timepiece unit 214 supplies data indicating a measured time to the memory controller 213 as write data.

The memory controller 213 writes data in the memory 212 and reads data from the memory 212. The memory controller 213 writes the write data at a designated address of the memory 212 in accordance with the write command. The time information (write data) is written at the address corresponding to the frequency identification information as the transmission time, and the time information (write data) is written at the address corresponding to frequency analysis result as the reception time.

Further, the memory controller 213 reads read data from the designated address in accordance with a read command from the round-trip time calculating unit 210 and supplies the read data to the round-trip time calculating unit 210. Here, the read command is a command for instructing reading of data from the designated address.

The memory 212 holds the transmission time of the transmission wave and the reception time of the reflected wave.

The round-trip time calculating unit 210 calculates a period of time from the transmission time of the transmission wave corresponding to the reflected wave to the reception time of the reflected wave as the round-trip time each time the reflected wave is received. The round-trip time calculating unit 210 issues a read command designating the address corresponding to the frequency identification information and the address corresponding to the frequency analysis result indicating the frequency identification information, and supplies the read command to the memory controller 213. Then, the round-trip time calculating unit 210 receives the transmission time and the reception time as the read data from the memory controller 213, and calculates the period of time from the transmission time to the reception time as the round-trip time. The round-trip time calculating unit 210 supplies the obtained round-trip time to ranging unit 211.

The ranging unit 211 measures the distance corresponding to the round-trip time. The ranging unit 211, for example, obtains a distance in accordance with the following Formula, and supplies distance information indicating the distance to the microcomputer 110.

$$R = c \times \text{Techo}/2 \quad \text{Formula 2}$$

In the above Formula, R is a distance, and a unit is, for example, a meter (m). Techo is the round-trip time, and a unit is, for example, a second (s).

With the above configuration, the radar apparatus 200 sequentially transmits a plurality of sound waves (that is, transmission waves) including different frequency components while changing a transmission direction every moment and receives the reflected waves as the respective transmission waves are reflected. At that time, for example, spatial resolution can be improved by narrowing and outputting the transmission wave in a specific direction by beamforming. Then, the radar apparatus 200 analyzes each frequency component of the reflected wave and identifies the corresponding transmission wave for each reflected wave. Then, the radar apparatus 200 measures the distance in accordance with the period of time from the transmission time of the corresponding transmission wave to the reception time of the reflected wave. The radar apparatus 200 measures the distance in order in each of a plurality of directions in accordance with a similar procedure, generates distance information that can be mapped to the transmission direction, and supplies the distance information to the microcomputer 110.

Figure 3:
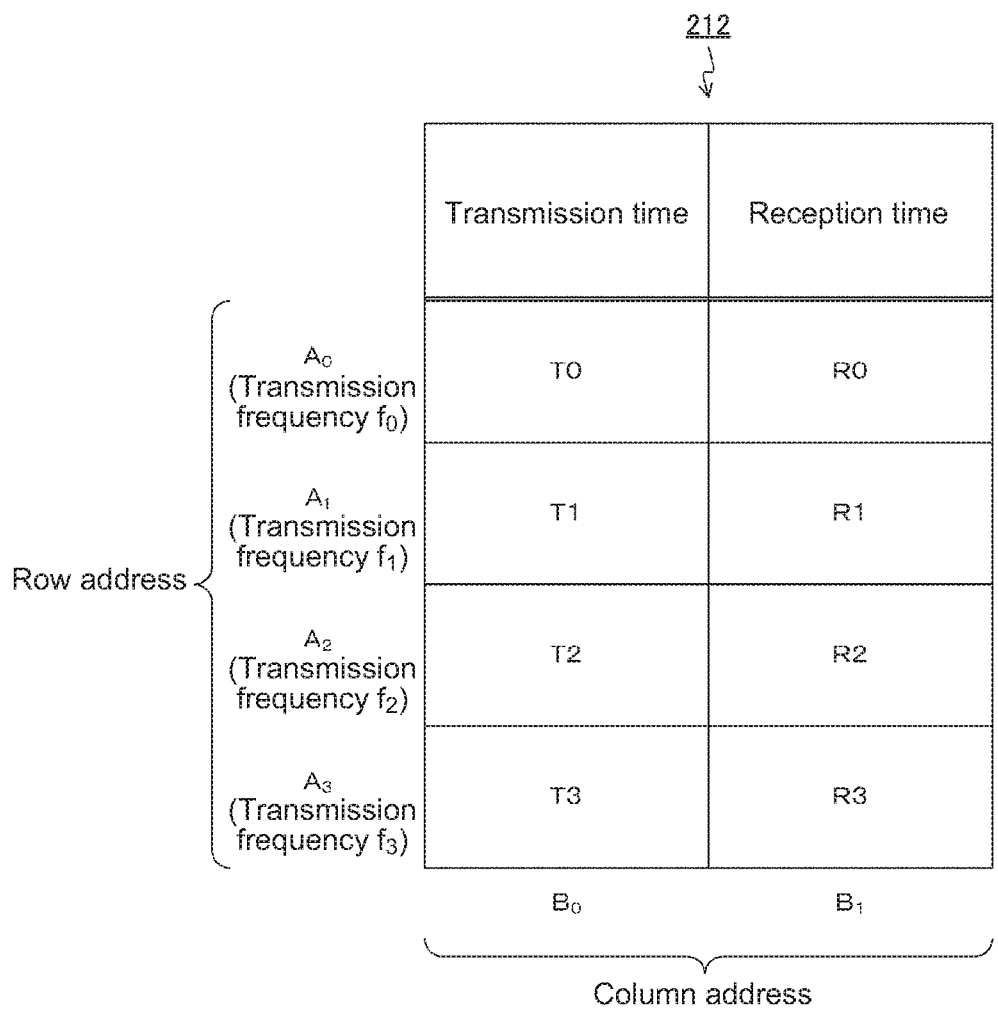
FIG. 3 is a diagram illustrating an example of data held in a memory in the first embodiment of the present technology.

FIG. 3 is a diagram illustrating an example of the data held in the memory 212 in the first embodiment of the present technology. The frequency identification information indicates, for example, one of transmission frequencies $f_0$, $f_1$, $f_2$ and $f_3$ which are different from each other. The control unit 215 changes the frequency identification information for each pulse period and switches the transmission frequency.

When the transmission wave of the transmission frequency $f_0$ is transmitted, the control unit 215 issues, for example, a write command designating an address of a row address $A_0$ and a column address $B_0$. Accordingly, the transmission frequency of the transmission wave of the transmission frequency $f_0$ is written at that address.

Further, the control unit 215 causes the transmission time of the transmission wave of the transmission frequency $f_1$ to be written at an address of a row address $A_1$ and a column address $B_0$ by the write command, and causes the transmission wave of the transmission frequency $f_2$ to be written at an address of a row address $A_2$ and a column address $B_0$. Similarly, the control unit 215 causes the transmission time of the transmission wave of the transmission frequency $f_3$ to be written at an address of a row address $A_3$ and a column address $B_0$.

Then, upon reception of the reflected wave corresponding to the transmission wave of the transmission frequency $f_0$, the control unit 215 issues, for example, a write command designating an address of a row address $A_0$ and a column address $B_1$. Accordingly, the reception time of the reflected wave corresponding to the transmission wave of the transmission frequency $f_0$ is written at that address.

Further, the control unit 215 causes the reception time corresponding to transmission frequency $f_1$ to be written at an address of a row address $A_1$ and a column address $B_1$ by the write command, and causes the reception time corresponding to the transmission frequency $f_2$ to be written at an address of a row address $A_2$ and a column address $B_1$. Similarly, the control unit 215 causes the reception time corresponding to the transmission frequency $f_3$ to be written at an address of a row address $A_3$ and a column address $B_1$.

Then, the round-trip time calculating unit 210 issues a read command designating a row address $A_0$ and a column address $B_0$. Accordingly, the transmission time of the transmission wave of the transmission frequency $f_0$ is read out. With similar control, the reception time of the reflected wave corresponding to the transmission wave of the transmission frequency $f_0$ is read out. Similarly, the transmission time and the reception time of other frequencies are also read out.

Note that, in FIG. 3, in order to simplify the description, information related to a direction is not described. In practice, since ranging is performed sequentially in a plurality of directions, the data illustrated in FIG. 3 is held in association with the transmission direction. A space can be scanned by changing the direction every moment and measuring the distance in a plurality of directions.

[Configuration Example of Transmission Wave Generating Unit]

Figure 4:
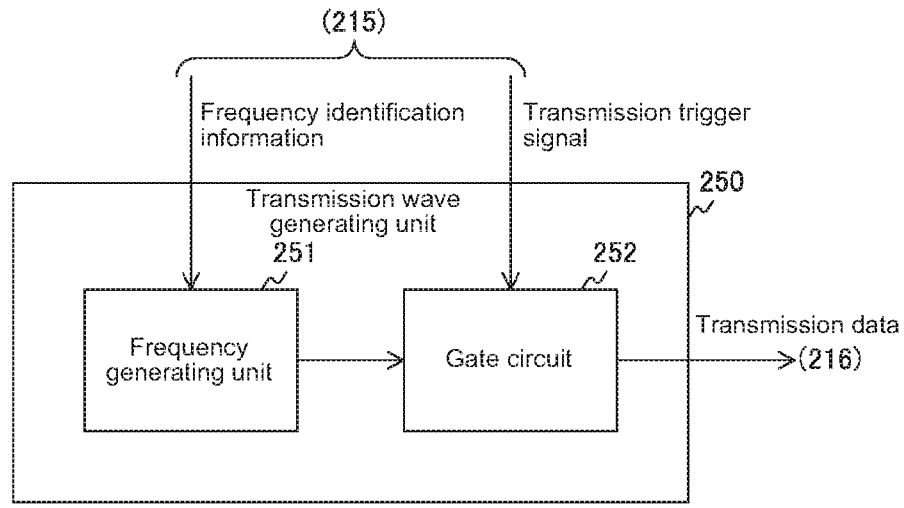
FIG. 4 is a block diagram illustrating a configuration example of a transmission wave generating unit in the first embodiment of the present technology.

FIG. 4 is a block diagram illustrating a configuration example of the transmission wave generating unit 250 in the first embodiment of the present technology. The transmission wave generating unit 250 includes a frequency generating unit 251 and a gate circuit 252.

The frequency generating unit 251 generates audio data of a frequency component indicated by the frequency identification information. The frequency generating unit 251 receives the frequency identification information from the control unit 215, and generates audio data of an analog signal of a continuous waveform of transmission frequency indicated by the frequency identification information. The frequency generating unit 251 supplies the generated audio data to the gate circuit 252.

The gate circuit 252 passes the continuous wave generated by the frequency generating unit 215 over a pulse width from a transmission trigger in synchronization with the transmission trigger, and generates audio data indicating a pulse. The gate circuit 252 supplies the generated audio data to the drive circuit 216 as the transmission data.

Note that the radar apparatus 200 transmits a pulse but may transmit a continuous wave instead of the pulse. When the continuous wave is generated, for example, it is desirable that the gate circuit 252 be not installed in the transmission wave generating unit 250, and the frequency generating unit 251 supply the audio data of the continuous wave to a subsequent stage without change. Then, the transmission frequency of the continuous wave is switched at intervals of the transmission triggers.

[Configuration Example of Frequency Analyzing Unit]

Figure 5:
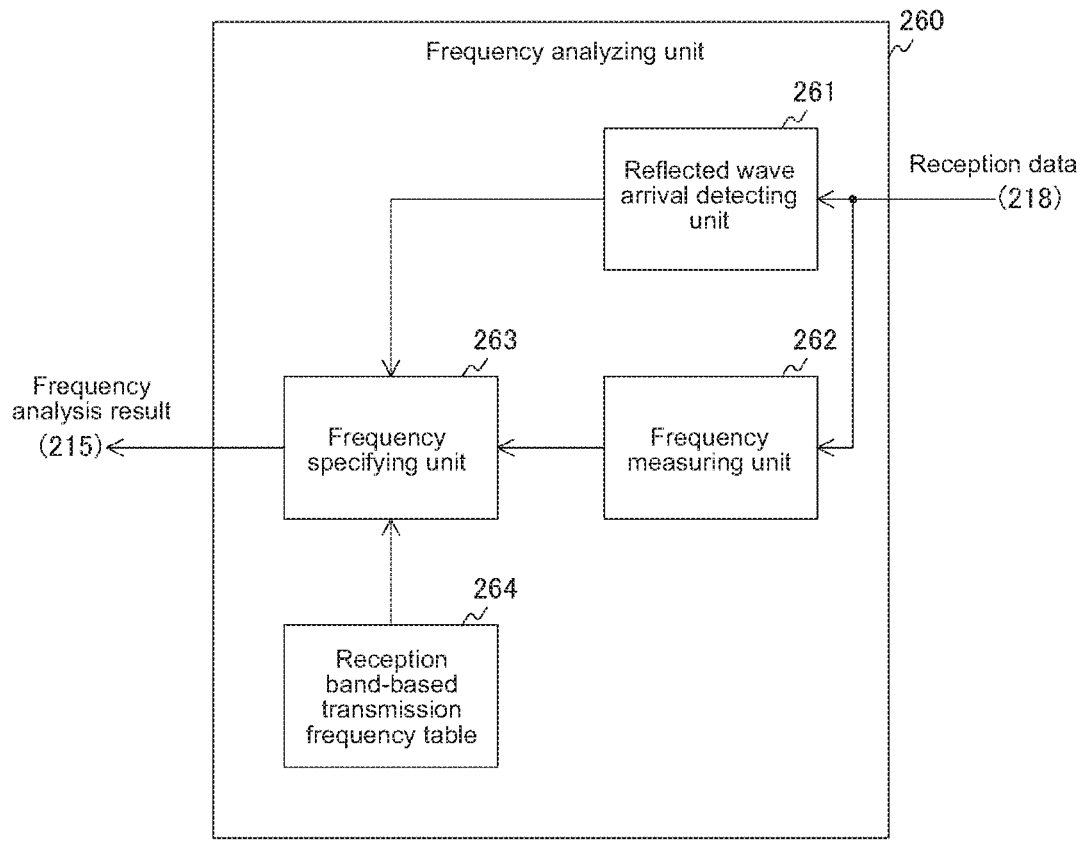
FIG. 5 is a block diagram illustrating a configuration example of a frequency analyzing unit in the first embodiment of the present technology.

FIG. 5 is a block diagram illustrating a configuration example of the frequency analyzing unit 260 in the first embodiment of the present technology. The frequency analyzing unit 260 includes a reflected wave arrival detecting unit 261, a frequency measuring unit 262, a frequency specifying unit 263, and a reception band-based transmission frequency table 264.

The reflected wave arrival detecting unit 261 detects whether or not the reflected wave arrives at the radar apparatus 200. For example, the reflected wave arrival detecting unit 261 compares a level of a signal obtained by rectifying and smoothing the reception data with a predetermined threshold value, and detects whether or not the reflected wave arrives on the basis of a comparison result. Then, the reflected wave arrival detecting unit 261 supplies the detection result to the frequency specifying unit 263.

The frequency measuring unit 262 obtains the reception frequency which is the frequency of the reflected wave. For example, the frequency measuring unit 262 performs Fourier transform on the reception data and obtains the frequency distribution of the reflected wave. Then, the frequency measuring unit 262 acquires the frequency of the frequency component with the highest amplitude in the frequency distribution as the reception frequency. The frequency measuring unit 262 supplies the value of the reception frequency to the frequency specifying unit 263.

The reception band-based transmission frequency table 264 is a table in which each of the frequency identification information is associated with the reception band including the transmission frequency indicated by the frequency identification information.

Here, when at least one of the target reflecting the reflected wave or the radar apparatus 200 is moving, a reception frequency different from the transmission frequency is observed due to the Doppler effect. The Doppler effect is a phenomenon in which a frequency different from a sound source is observed due to the presence of a relative velocity between the sound source and the observer. In this phenomenon, the observed frequency is indicated by the following Formula.

$$f_o = f_s \times (c - v_o)/(c - v_s) \quad \text{Formula 3}$$

In the above Formula, $f_s$ is a frequency of the sound source, and $f_o$ is the frequency observed by the observer. The units of these frequencies are, for example, hertz (Hz). Also, $v_o$ is a velocity of the observer, and $v_s$ is a velocity of the sound source. The units of these velocities are, for example, meters per second (m/s). When the transmission wave arrives at the target, since the radar apparatus 200 is the sound source, the transmission frequency corresponds to $f_s$, the velocity of the radar apparatus 200 corresponds to $v_s$, and the velocity of the target corresponds to $v_o$. Also, when the reflected wave reflected by the target arrives at the radar apparatus 200, since the target becomes the sound source, the reception frequency corresponds to $f_o$, the velocity of the target corresponds to $v_s$, and the velocity of radar apparatus 200 corresponds to $v_o$.

In consideration of a shift caused by the Doppler effect shown in Formula 3, the reception frequency of transmission frequency $f_i \pm df$ is associated with the frequency identification information of the transmission frequency.

The frequency specifying unit 263 acquires the transmission frequency corresponding to the reflected wave. The frequency specifying unit 263 acquires the frequency identification information corresponding to the reception band including the measured reception frequency from the reception band-based transmission frequency table 264. Accordingly, the transmission wave indicated by the frequency identification information is specified as corresponding to the reflected wave. The frequency specifying unit 263 supplies the acquired frequency identification information to the control unit 215 as the frequency analysis result.

Figure 6:
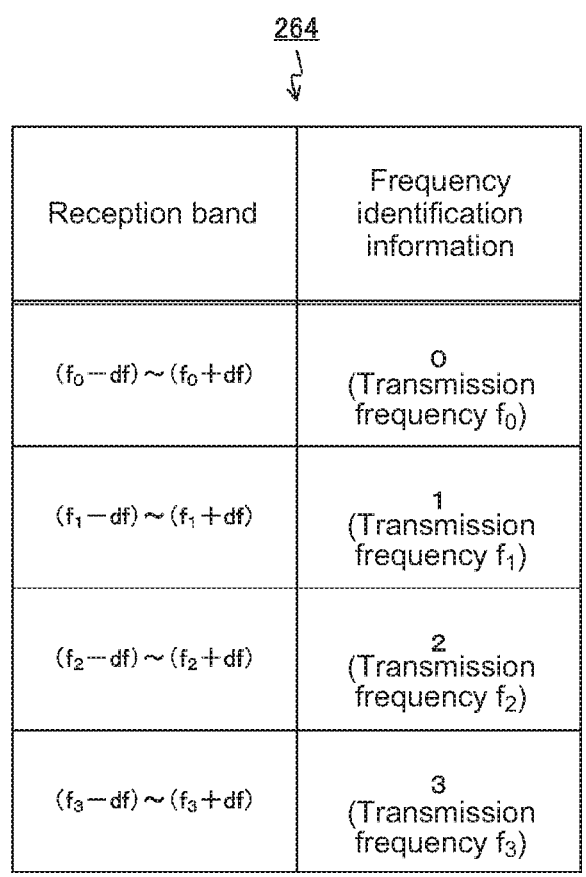
FIG. 6 is a diagram illustrating a configuration example of a reception band-based transmission frequency table in the first embodiment of the present technology.

FIG. 6 is a diagram illustrating a configuration example of the reception band-based transmission frequency table 264 in the first embodiment of the present technology. The reception band of transmission frequency $f_0 \pm df$ is held in association with the frequency identification information of that transmission frequency $f_0$. Also, the reception band of transmission frequency $f_1 \pm df$ is held in association with the frequency identification information of the transmission frequency $f_1$. Similarly, the reception band of transmission frequency $f_2 \pm df$ is held in association with the frequency identification information of the transmission frequency $f_2$, and the reception band of transmission frequency $f_3 \pm df$ is held in association with the frequency identification information of transmission frequency $f_3$.

A value larger than an estimated value of the shift amount by the Doppler effect is set in df. Further, values sufficiently separated from each other so that the respective reception bands do not overlap are set as the transmission frequencies $f_0$ to $f_3$.

As described above, when the reception frequency is within the reception frequency of transmission frequency±df, the frequency specifying unit 263 acquires the transmission frequency as the transmission frequency corresponding to the reflected wave. As described above, when the reception band of a certain range including the transmission frequency is set, the frequency specifying unit 263 can acquire the transmission frequency corresponding to the reflected wave even when the frequency changes due to the Doppler effect.

Figure 7:
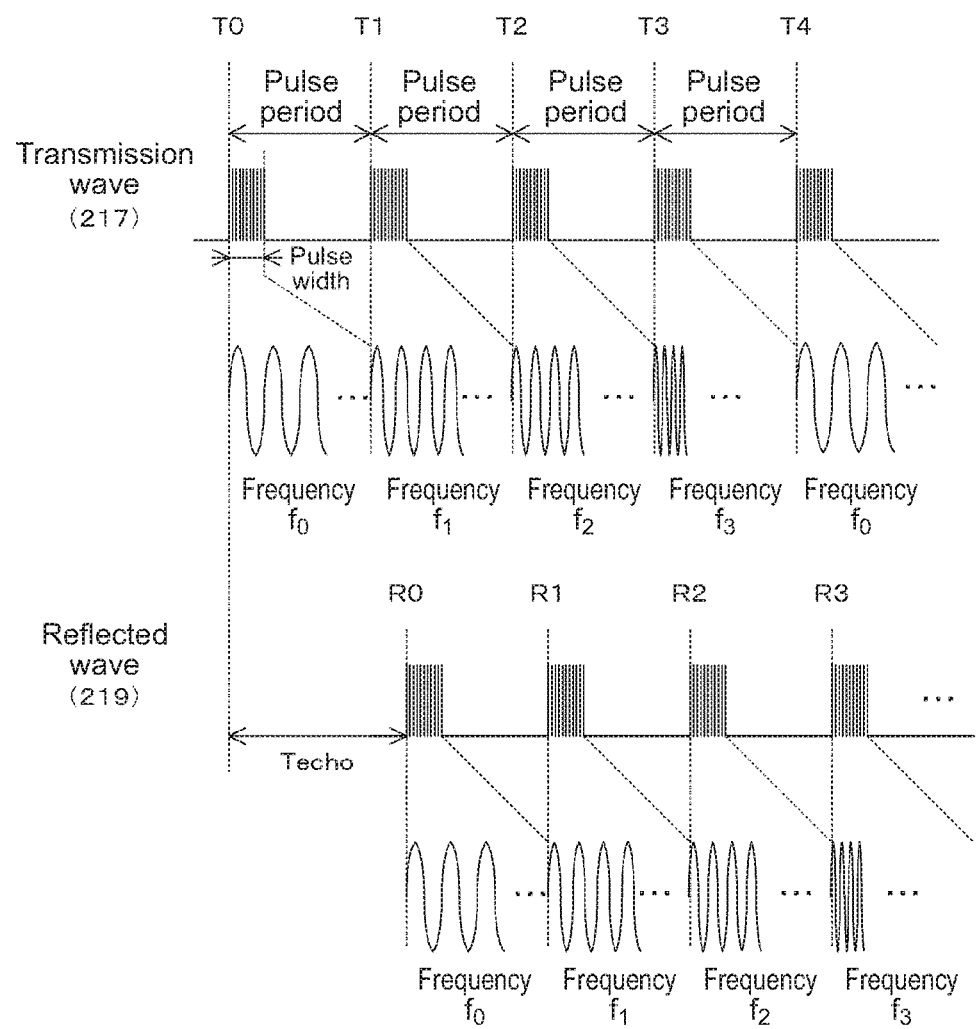
FIG. 7 is a timing chart illustrating an example of transmission/reception timings of a transmission wave and a reflected wave in the first embodiment of the present technology.

FIG. 7 is a timing chart illustrating an example of transmission/reception timings of the transmission wave and the reflected wave in the first embodiment of the present technology. The transmitter 217 is assumed to start transmission at a certain timing T0. The transmitter 217 transmits the transmission wave of the transmission frequency $f_0$ at the timing T0, and transmits the transmission wave of transmission frequency $f_1$ at a timing T1 at which the pulse period has elapsed from the timing T0. Then, the transmitter 217 transmits the transmission wave of the transmission frequency $f_2$ at a timing T2 at which the pulse period has elapsed from the timing T1 and transmits the transmission wave of the transmission frequency $f_3$ at a timing T3 at which the pulse period has elapsed from the timing T2. The transmitter 217 repeatedly performs the transmission of the transmission waves of the transmission frequencies $f_0$ to $f_3$ after the timing T4 at which the pulse period has elapsed from the timing T3.

Also, the receiver 219 receives the reflected wave of reception frequency $f_0$ at a timing R0 between the timing T1 and the timing T2. Note that the Doppler effect is assumed not to occur.

The radar apparatus 200 analyzes the frequency of the reflected wave and specifies the corresponding transmission wave. Then, the radar apparatus 200 acquires the round-trip time Techo from the timing T0 of the transmission of the specified transmission wave to the timing R0 of the reception of the reflected wave, and measures the distance using Formula 2.

Here, a comparative example in which the radar apparatus repeatedly transmits the pulse (transmission wave) without changing the transmission frequency is assumed. In this comparative example, when the reflected wave is received at the timing R0, the radar apparatus is unable to determine whether or not the transmission wave corresponding to the reflected wave is the transmission wave of the timing T0 or the transmission wave of the timing T1. For this reason, in the comparative example, the round-trip time is limited to $1/f_P$ or less. The distance which can be measured under this limitation, that is, the maximum detectable range $R_{MAX}$, is indicated by Formula 1.

On the other hand, in the radar apparatus 200 that changes the transmission frequency for each pulse period, since the transmission frequencies of the timings T0 and T1 are different, the reflected wave can be determined to corresponds to the timing T0 by the frequency analysis. However, when the reflected wave is received after a timing T4, the radar apparatus 200 is unable to determine whether or not the transmission wave corresponding to the reflected wave is the transmission wave of the timing T0 or the transmission wave of the timing T4. For this reason, in the radar apparatus 200, the round-trip time is limited to $4/f_P$ or less. Under this limitation, a maximum detectable range $R_{MAX}'$ is indicated by the following Formula.

$$R_{MAX}'=4\times c/(2\times f_P) \quad \text{Formula 4}$$

From Formula 1 and Formula 4, the radar apparatus 200 can extend the maximum detectable range up to four times that in the comparative example. Also, since the transmission frequency of the sound waves can be made four times as large as that in the comparative example under the restriction that the maximum detectable range is set to a certain level or more, the resolution when the space is scanned is increased to four times as large as that in the comparative example. Alternatively, the throughput of the scanned image can be increased under the restriction that the maximum detectable range is set to a certain value or more.

Further, the vehicle control system 100 can use the radar apparatus 200 using the sound wave in combination with an electromagnetic wave radar. Since the electromagnetic wave passes through glass or the like, but the sound wave is reflected, and the sound wave has higher ranging accuracy than the electromagnetic wave, when the sound wave and the electromagnetic wave are used in combination, the ranging performance of the vehicle control system 100 can be improved.

Note that, in the radar apparatus 200, the number of transmission frequencies to be controlled are four, that is, $f_0$ to $f_3$ are transmission frequencies to be controlled, but the number of transmission frequencies may be a number other than four as long as it is two or more.

[Operation Example of Radar Apparatus Operation]

Figure 8:
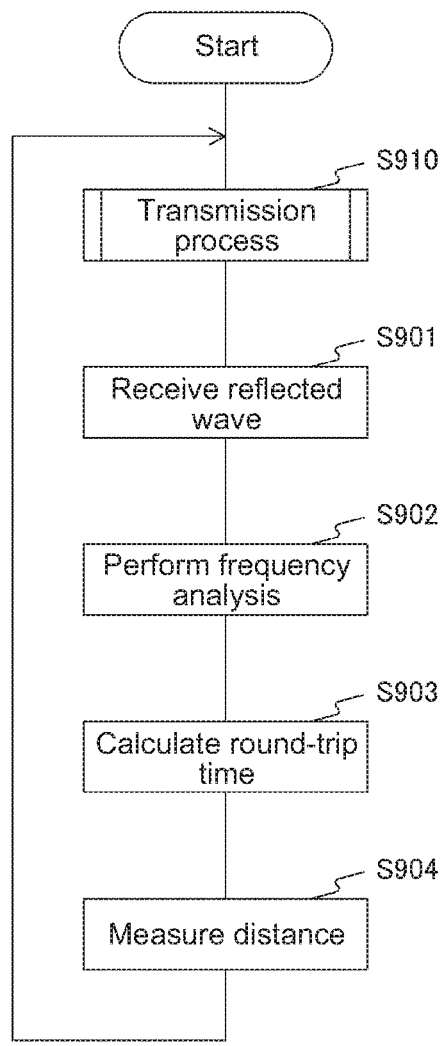
FIG. 8 is a flowchart illustrating an example of an operation of the radar apparatus in the first embodiment of the present technology.

FIG. 8 is a flowchart illustrating an example of an operation of the radar apparatus 200 in the first embodiment of the present technology.

The radar apparatus 200 executes the transmission process for transmitting the transmission wave (step S910), and receives the reflected wave (step S901). Then, the radar apparatus 200 performs the frequency analysis on the reflected wave (step S902), and specifies the corresponding transmission wave.

Next, the radar apparatus 200 calculates the round-trip time from the transmission time of the corresponding transmission wave to the reception time of the reflected wave (step S903), and measures the distance corresponding to the round-trip time (step S904). After step S904, the radar apparatus 200 repeatedly executes the processing after step S910.

Figure 9:
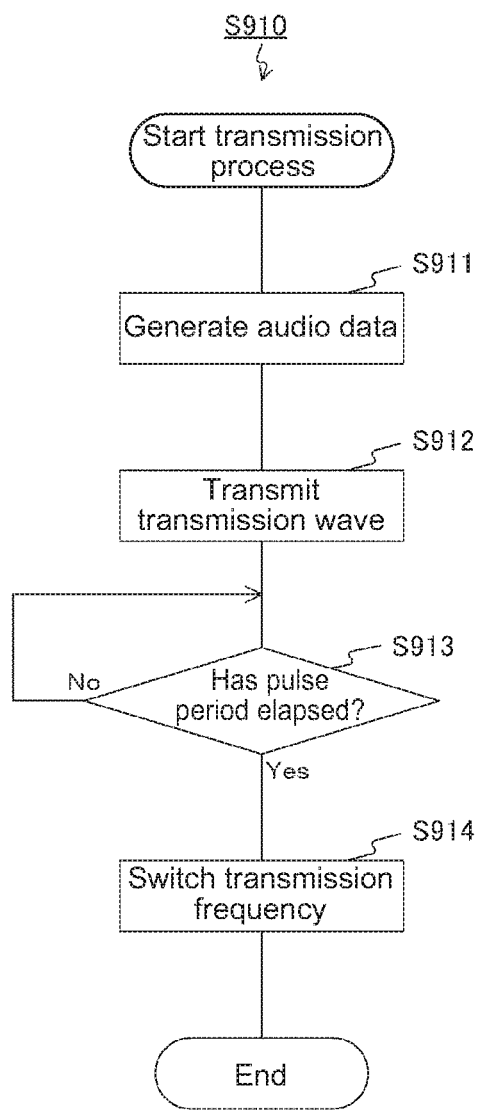
FIG. 9 is a flowchart illustrating an example of a transmission process in the first embodiment of the present technology.

FIG. 9 is a flowchart illustrating an example of the transmission process in the first embodiment of the present technology. The radar apparatus 200 generates audio data of one of the transmission frequencies $f_0$ to $f_3$ (step S911), generates the transmission wave from the audio data, and transmits the transmission wave (step S912). Then, the radar apparatus 200 determines whether or not the pulse period has elapsed (step S913).

When the pulse period has elapsed (Yes in step S913), the radar apparatus 200 switches the transmission frequency to be transmitted next (step S914), and ends the transmission process. On the other hand, when the pulse period has not elapsed (No in step S913), the radar apparatus 200 repeats step S913 and subsequent steps.

As described above, according to the first embodiment of the present technology, the radar apparatus 200 sequentially transmits a plurality of sound waves including different frequency components, and specifies the sound wave corresponding to the reflected wave through the frequency analysis, and thus even when the round-trip time is longer than the transmission interval, the corresponding sound wave can be specified. Accordingly, it is possible to increase the maximum detectable range to be larger than that when the frequency is not changed.

2. Second Embodiment

In the first embodiment described above, since the radar apparatus 200 sets the reception frequency of the transmission frequency ±df, it is possible to specify the transmission wave if the shift amount of the frequency caused by the Doppler effect is within ±df. However, When the shift amount caused by the Doppler effect is larger than df, the transmission wave is unable to be specified, and the distance measurement is unable to be accurately performed. A radar apparatus 200 in a second embodiment differs from that in the first embodiment in that it can accurately measure the distance regardless of the amount shift of the frequency caused by the Doppler effect.

Figure 10:
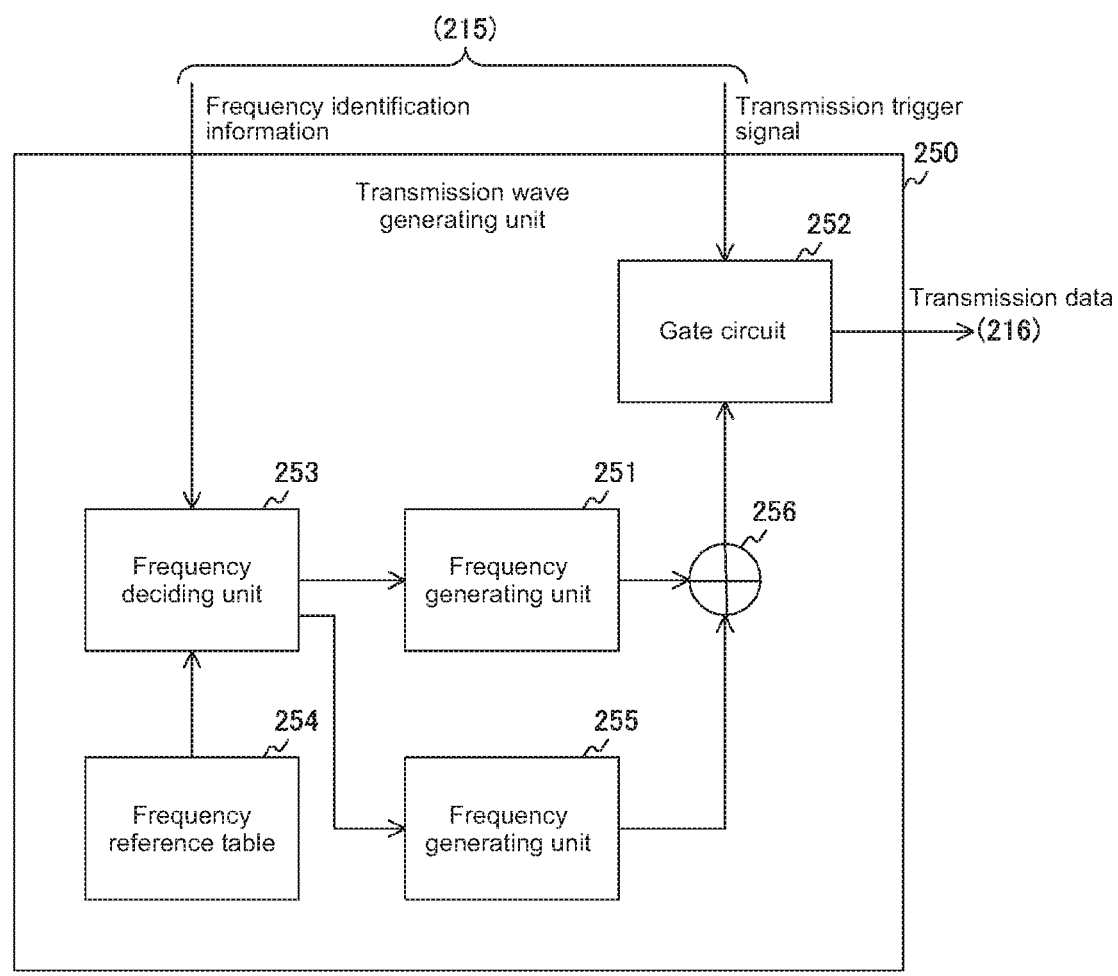
FIG. 10 is a block diagram illustrating a configuration example of a transmission wave generating unit in a second embodiment of the present technology.

FIG. 10 is a block diagram illustrating a configuration example of the transmission wave generating unit 250 in the second embodiment of the present technology. A configuration of the transmission wave generating unit 250 of the second embodiment differs from that in the first embodiment in that it further includes a frequency deciding unit 253, a frequency reference table 254, a frequency generating unit 255, and a combining unit 256.

The frequency reference table 254 is a table that holds values of a pair of transmission frequencies for each piece of frequency identification information. Further, in the frequency reference table 254, a ratio of a pair of corresponding transmission frequencies is assumed to differ for each piece of frequency identification information.

The frequency deciding unit 253 decides the value of each of a pair of transmission frequencies. The frequency deciding unit 253 receives the frequency identification information from the control unit 215, acquires values of a pair of transmission frequencies corresponding to the frequency identification information from the frequency reference table 254, and decides the acquired value as the values. The frequency deciding unit 253 sets one of the decided values of a pair of transmission frequencies in the frequency generating unit 251 and sets the other in the frequency generating unit 255.

Each of the frequency generating units 251 and 255 generates audio data indicating a waveform of the frequency component of the set value and supplies the audio data to the combining unit 256. The combining unit 256 combines the frequency components of the respective pieces of audio data. Then, the combining unit 256 supplies the combined audio data to the gate circuit 252.

FIG. 11 is a diagram illustrating an example of the frequency reference table 254 in the second embodiment of the present technology. The frequency reference table holds the values of a pair of transmission frequency for each piece of frequency identification information. For example, the values of the transmission frequency $f_0$ and $f_4$ are held for the frequency identification information "0." Also, the values of the transmission frequency $f_1$ and $f_5$ are held for the frequency identification information "1," and the values of transmission frequency $f_2$ and $f_6$ are held for the frequency identification information "2." The values of transmission frequency $f_3$ and $f_7$ are held for the frequency identification information "3."

Also, the ratio of transmission frequency $f_4$ to the transmission frequency $f_0$ is indicated by a frequency ratio $K_0$, and the ratio of transmission frequency $f_5$ to the transmission frequency $f_1$ is indicated by a frequency ratio $K_1$. The ratio of transmission frequency $f_6$ to the transmission frequency $f_2$ is indicated by a frequency ratio $K_2$, and the ratio of transmission frequency $f_7$ to the transmission frequency $f_3$ is indicated by a frequency ratio $K_3$. The frequency ratios $K_1$ to $K_4$ have different values. With the settings, the radar apparatus 200 can transmit the transmission wave including a pair of frequency components for each pulse period, and change the frequency ratio of a pair of frequency components for each pulse period.

Figure 12:
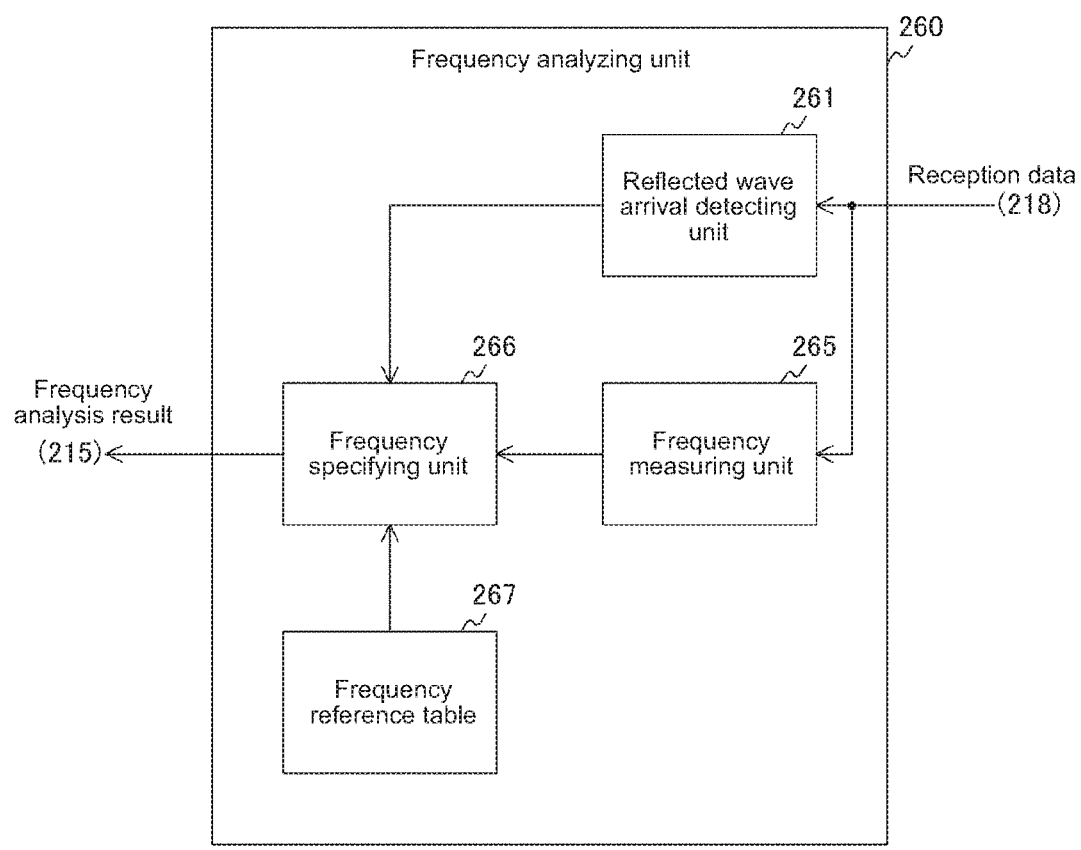
FIG. 12 is a block diagram illustrating a configuration example of a frequency analyzing unit in the second embodiment of the present technology.

FIG. 12 is a block diagram illustrating a configuration example of the frequency analyzing unit 260 in the second embodiment of the present technology. The frequency analyzing unit 260 of the second embodiment includes a frequency measuring unit 265, a frequency specifying unit 266, and a frequency reference table 267 instead of the frequency measuring unit 262, the frequency specifying unit 263, and the reception band-based transmission frequency table 264.

The frequency measuring unit 265 measures the reception frequency of each of a pair of frequency components in the reflected wave through the frequency analysis. For example, the frequency measuring unit 265 performs the Fourier transform on the reception data and acquires the frequency distribution of the reflected wave. Then, the frequency measuring unit 265 acquires the frequency of each of the frequency component of the highest amplitude and the frequency component of the second highest amplitude in the frequency distribution as the reception frequency. The frequency measuring unit 265 supplies the value of each of a pair of acquired reception frequencies to the frequency specifying unit 266.

The frequency reference table 267 is a table similar to the frequency reference table 254 on the transmission side.

Then, the frequency specifying unit 266 acquires, from the frequency reference table 267, the frequency identification information corresponding to a pair of transmission frequencies in which the reflected wave and the frequency ratio substantially coincide with each other.

Here, if the transmission frequency $f_0$ and $f_4$ are changed to $f_0'$ and $f_4'$ due to the Doppler effect when arriving at the target, values thereof are indicated by the following Formula on the basis of Formula 3.

$$f_0' = f_0 \times (c - v_t)/(c - v_r) \quad \text{Formula 5}$$

$$f_4' = f_4 \times (c - v_t)/(c - v_r) \quad \text{Formula 6}$$

In the above Formula, $v_t$ is the velocity of the target (observer), and $v_r$ is the velocity of the radar apparatus 200 (sound source).

Then, if the frequencies $f_0'$ and $f_4'$ of the reflected wave reflected by the target are changed to $f_0''$ and $f_4''$ due to the Doppler effect when arriving at the radar apparatus 200, values thereof are indicated by the following Formula 3 on the basis of the following Formula 4.

$$f_0'' = f_0' \times (c - v_t)/(c - v_r) \quad \text{Formula 7}$$

$$f_4'' = f_4' \times (c - v_t)/(c - v_r) \quad \text{Formula 8}$$

If the frequency ratio of the transmission frequency $f_4$ to the transmission frequency $f_0$ is indicated by $K_0$, the frequency ratio of the reception frequency $f_4''$ to the reception frequency $f_0''$ is also indicated by $K_0$ by Formulas 5 to 8. As described above, even if the frequency is shifted due to the Doppler effect, the frequency ratio does not change. Therefore, the radar apparatus 200 can accurately measure the distance from the frequency ratio even if the frequency is shifted due to the Doppler effect.

Figure 13:
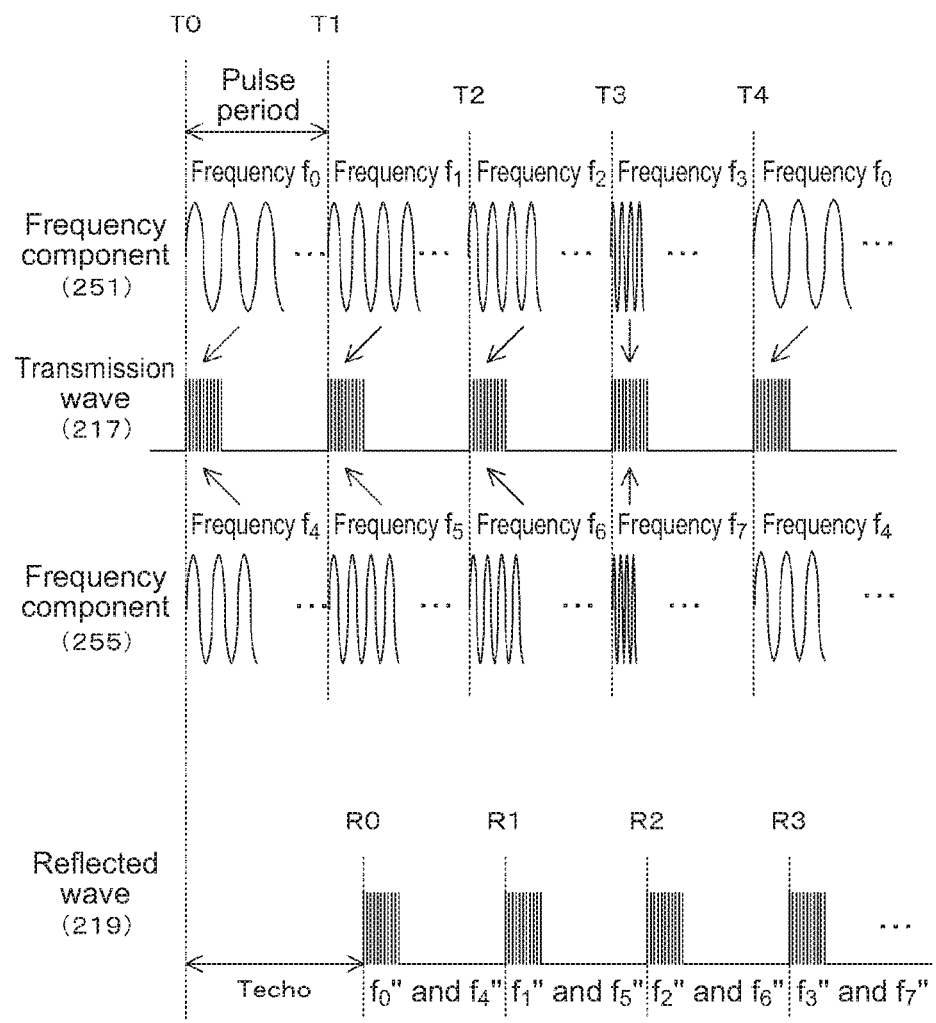
FIG. 13 is a timing chart illustrating an example of transmission/reception timings of a transmission wave and a reflected wave in the second embodiment of the present technology.

FIG. 13 is a timing chart illustrating an example of transmission/reception timings of the transmission wave and the reflected wave in the second embodiment of the present technology. The transmitter 217 is assumed to start transmission at a certain timing T0. At a timing T0, the frequency generating unit 251 generates audio data of the frequency component of the transmission frequency $f_0$, and the frequency generating unit 255 generates audio data of the frequency component of the transmission frequency $f_4$. Then, the transmitter 217 transmits the transmission wave including the frequency components.

Then, the transmitter 217 transmits the transmission wave including the frequency components of the transmission frequencies $f_1$ and $f_5$ at a timing T1, and transmits the transmission wave including the frequency components of the transmission frequencies $f_2$ and $f_6$ at a timing T2. At a timing T3, the transmitter 217 transmits the transmission wave including the frequency components of the transmission frequencies $f_3$ and $f_7$.

Also, the receiver 219 is assumed to receive the reflected wave including the frequency components of the reception frequencies $f_0''$ and $f_4''$ at a timing R0.

The radar apparatus 200 analyzes the frequency of the reflected wave, obtains the frequency ratio, and specifies the corresponding transmission wave. Then, the radar apparatus 200 obtains the round-trip time Techo from the timing T0 of the transmission of the specified transmission wave to the timing R0 of the reception of the reflected wave, and measures the distance using Formula 2.

Here, even when the frequency is changed due to the Doppler effect, the frequency ratio does not change as described above. Therefore, the radar apparatus 200 can specify the corresponding transmission wave and perform ranging regardless of the frequency change caused by the Doppler effect by obtaining the frequency ratio.

As described above, in the second embodiment of the present technology, the radar apparatus 200 transmits a plurality of sound waves with different frequency ratios and specifies the corresponding sound wave from the frequency ratio of the reflected wave, and thus even when the frequency is changed due to the Doppler effect, it is possible to specify the corresponding sound wave and perform ranging.

Note that the above-described embodiments are the examples for carrying out the present technology, and the matters in the embodiment and the invention-specifying matters in claims set forth below have a correspondence relation. Similarly, the invention-specifying matters in claims set forth below and the matters in the embodiment of the present technology having the same name as those have a corresponding relationship. However, the present technology is not limited to the embodiments and can be carried out by variously modifying the embodiments without departing from the scope of the invention.

Further, the processing procedures described in the above-described embodiments may be regarded as a method having a series of procedures described above or may be regarded as a program causing a computer to execute a series of procedures described above or a recording medium that stores the program. As the recording medium, for example, a compact disc (CD), a mini disc (MD), a digital versatile disc (DVD), a memory card, a Blu-ray (registered trademark) disc, or the like can be used.

Note that the effects described in this specification are merely examples and are not limited, and other effects may be included.

Note that the present technology can also have the following configurations.

(1) A radar apparatus, including:
a transmitting unit that transmits a plurality of sound waves including different frequency components in order;
a receiving unit that receives reflected waves obtained as the plurality of sound waves is reflected;
an analyzing unit that analyzes a frequency component of each of the reflected waves and identifies, for each reflected wave, the sound wave corresponding to the reflected wave among the plurality of sound waves on the basis of the analysis result; and
a ranging unit that acquires a distance corresponding to a period of time from a transmission time of the sound wave corresponding to the reflected wave to a reception time of the reflected wave.

(2) The radar apparatus according to (1), in which
the plurality of sound waves has different frequencies, and
the analyzing unit analyzes a frequency of the reflected wave.

(3) The radar apparatus according to (2), in which
the analyzing unit includes
a reception band-based frequency table in which the frequency of each of the plurality of sound waves is associated with a reception band including the frequency, and
a frequency specifying unit that specifies the sound wave corresponding to the reception band including the frequency of the reflected wave as the sound wave corresponding to the reflected wave.

(4) The radar apparatus according to (1), in which
each of the plurality of sound waves includes a pair of frequency components,
the plurality of sound waves differs in a frequency ratio of each of the pair of frequency components, and
the analyzing unit analyzes the frequency ratio of each of a pair of frequency components in the reflected wave.

(5) The radar apparatus according to (4), in which
the analyzing unit includes
a frequency reference table which holds the frequency ratio as a frequency ratio for each of the plurality of sound waves, and
a frequency specifying unit that specifies the sound wave corresponding to the frequency ratio substantially coinciding with the frequency ratio of each of the pair of frequency components in the reflected wave as the sound wave corresponding to the reflected wave.

(6) The radar apparatus according to any one of (1) to (5), in which
each of the plurality of sound waves is a pulse.

(7) A radar system, including:
a transmitting unit that transmits a plurality of sound waves including different frequency components in order;
a receiving unit that receives reflected waves obtained as the plurality of sound waves is reflected;
an analyzing unit that analyzes a frequency component of each of the reflected waves and identifies, for each reflected wave, the sound wave corresponding to the reflected wave among the plurality of sound waves on the basis of the analysis result;
a ranging unit that acquires a distance corresponding to a period of time from a transmission time of the sound wave corresponding to the reflected wave to a reception time of the reflected wave; and
a control unit that performs predetermined control on the basis of the acquired distance.

(8) A control method of a radar apparatus, including:
a transmitting unit process of transmitting a plurality of sound waves including different frequency components in order;
a receiving process of receiving reflected waves obtained as the plurality of sound waves is reflected;
an analyzing process of analyzing a frequency component of each of the reflected waves and identifies, for each reflected wave, the sound wave corresponding to the reflected wave among the plurality of sound waves on the basis of the analysis result; and
a ranging process of acquiring a distance corresponding to a period of time from a transmission time of the sound wave corresponding to the reflected wave to a reception time of the reflected wave.

REFERENCE SIGNS LIST 100 vehicle control system
110 microcomputer
120 drive unit control unit
200 radar apparatus
210 round-trip time calculating unit
211 ranging unit
212 memory
213 memory controller
214 timepiece unit
215 control unit
216 drive circuit
217 transmitter
218 receiving circuit
219 receiver
250 transmission wave generating unit
251, 255 frequency generating unit
252 gate circuit
253 frequency deciding unit
254, 267 frequency reference table
256 combining unit
260 frequency analyzing unit
261 reflected wave arrival detecting unit
262, 265 frequency measuring unit
263, 266 frequency specifying unit
264 reception band-based transmission frequency table

The invention claimed is:
1. A radar apparatus, comprising:
a transmitting unit configured to transmit a plurality of sound waves,
wherein each sound wave of the transmitted plurality of sound waves has a respective pair of frequency components of a plurality of pairs of frequency components,
wherein each of the plurality of pairs of frequency components has a respective frequency ratio, and
wherein a first frequency ratio of a first pair of frequency components of the plurality of pairs of frequency components is different from a second frequency ratio of a second pair of frequency components of the plurality of pairs of frequency components;
a receiving unit configured to receive a plurality of reflected waves corresponding to the transmitted plu- rality of sound waves, wherein each of the plurality of reflected waves corresponds to a respective sound wave of the transmitted plurality of sound waves;

an analyzing unit configured to:
  determine a respective specific ratio of a specific pair of frequency components of each of the plurality of reflected waves; and
  identify, for each reflected wave of the plurality of reflected waves, the respective sound wave of the transmitted plurality of sound waves, wherein the identification is based on:
    the respective frequency ratio of each of the plurality of pairs of frequency components of each of the transmitted plurality of sound waves, and
    the respective specific ratio of the specific pair of frequency components of each of the plurality of reflected waves; and
a ranging unit configured to determine a distance corresponding to each sound wave of the transmitted plurality of sound waves, wherein the distance is determined based on:
  the identification of the transmitted plurality of sound waves, and
  a period of time from a transmission time of each sound wave of the transmitted plurality of sound waves to a reception time of a respective reflected wave of the plurality of reflected waves.

2. The radar apparatus according to claim 1, wherein the analyzing unit includes:
  a frequency reference table which holds the respective frequency ratio of the plurality of pairs of frequency components of each of the transmitted plurality of sound waves, and
  a frequency specifying unit configured to specify, for each reflected wave of the plurality of reflected waves, the respective sound wave of the transmitted plurality of sound waves based on substantial coincident of the respective frequency ratio of the plurality of pairs of frequency components with the respective specific ratio of the specific pair of frequency components.

3. The radar apparatus according to claim 1, wherein each of the transmitted plurality of sound waves is a pulse.

4. A radar system, comprising:
  a transmitting unit configured to transmit a plurality of sound waves,
    wherein each sound wave of the transmitted plurality of sound waves has a respective pair of frequency components of a plurality of pairs of frequency components,
    wherein each of the plurality of pairs of frequency components has a respective frequency ratio, and
    wherein a first frequency ratio of a first pair of frequency components of the plurality of pairs of frequency components is different from a second frequency ratio of a second pair of frequency components of the plurality of pairs of frequency components;
  a receiving unit configured to receive a plurality of reflected waves corresponding to the transmitted plurality of sound waves, wherein each of the plurality of reflected waves corresponds to a respective sound wave of the transmitted plurality of sound waves;
  an analyzing unit configured to:
    determine a respective specific ratio of a specific pair of frequency components of each of the plurality of reflected waves; and
    identify, for each reflected wave of the plurality of reflected waves, the respective sound wave of the transmitted plurality of sound waves, wherein the identification is based on:
      the respective frequency ratio of each of the plurality of pairs of frequency components of each of the transmitted plurality of sound waves, and
      the respective specific ratio of the specific pair of frequency components of each of the plurality of reflected waves;
  a ranging unit configured to determine a distance corresponding to each sound wave of the transmitted plurality of sound waves, wherein the distance is determined based on:
    the identification of the transmitted plurality of sound waves, and
    a period of time from a transmission time of each sound wave of the transmitted plurality of sound waves to a reception time of a respective reflected wave of the plurality of reflected waves; and
  a control unit configured to control a process based on determined distance.

5. A control method of a radar apparatus, comprising:
  transmitting a plurality of sound waves,
    wherein each sound wave of the transmitted plurality of sound waves has a respective pair of frequency components of a plurality of pairs of frequency components,
    wherein each of the plurality of pairs of frequency components has a respective frequency ratio, and
    wherein a first frequency ratio of a first pair of frequency components of the plurality of pairs of frequency components is different from a second frequency ratio of a second pair of frequency components of the plurality of pairs of frequency components;
  receiving a plurality of reflected waves corresponding to the transmitted plurality of sound waves, wherein each of the plurality of reflected waves corresponds to a respective sound wave of the transmitted plurality of sound waves;
  determining a respective specific ratio of a specific pair of frequency components of each of the plurality of reflected waves;
  identifying, for each reflected wave of the plurality of reflected waves, the respective sound wave of the transmitted plurality of sound waves, wherein the identification is based on:
    the respective frequency ratio of each of the plurality of pairs of frequency components of each of the transmitted plurality of sound waves, and
    the respective specific ratio of the specific pair of frequency components of each of the plurality of reflected waves; and
  determining a distance corresponding to each sound wave of the transmitted plurality of sound waves, wherein the distance is determined based on:
    the identification of the transmitted plurality of sound waves, and
    a period of time from a transmission time of each sound wave of the transmitted plurality of sound waves to a reception time of a respective reflected wave of the plurality of reflected waves.

* * * * *